US012152726B1

(12) United States Patent
Lin

(10) Patent No.: US 12,152,726 B1
(45) Date of Patent: Nov. 26, 2024

(54) DUAL-MODE LUBRICATOR WITH MOVEMENT-LIMITING FUNCTION AND POTENTIOMETER

(71) Applicant: HORNCHE CORPORATION, Taoyuan (TW)

(72) Inventor: Shih-Kuei Lin, Taoyuan (TW)

(73) Assignee: HORNCHE CORPORATION, Taoyuan (TW)

( * ) Notice: Subject to any disclaimer, the term of this patent is extended or adjusted under 35 U.S.C. 154(b) by 0 days.

(21) Appl. No.: 18/525,866

(22) Filed: Dec. 1, 2023

(51) Int. Cl.
*F16N 25/00* (2006.01)
(52) U.S. Cl.
CPC .................................... *F16N 25/00* (2013.01)
(58) Field of Classification Search
CPC ........... F16N 25/00; F16N 5/00; F01M 11/10; F01M 11/04
USPC ................... 184/27.1, 27.2, 38.4, 105.1, 108
See application file for complete search history.

(56) References Cited

U.S. PATENT DOCUMENTS

| | | | | |
|---|---|---|---|---|
| 5,271,528 A * | 12/1993 | Chien | ..................... | F16N 11/08 222/326 |
| 6,125,969 A * | 10/2000 | Graf | ........................ | F16N 11/08 184/26 |
| 6,216,822 B1 * | 4/2001 | May | ........................ | F16N 11/08 184/26 |
| 6,802,394 B2 * | 10/2004 | Patterson | ................ | F16N 11/04 184/45.1 |
| 7,228,941 B2 * | 6/2007 | Weigand | ................ | F16N 11/08 184/7.4 |
| 9,115,847 B2 * | 8/2015 | Guillaume | .............. | F16N 11/08 |
| 9,458,964 B2 * | 10/2016 | Eisenbacher | .......... | F16N 11/08 |
| 2003/0037995 A1 * | 2/2003 | Patterson | ................ | F16N 11/04 184/105.1 |
| 2011/0253481 A1 * | 10/2011 | Lin | ........................ | F16N 11/08 184/108 |

* cited by examiner

*Primary Examiner* — Michael R Mansen
*Assistant Examiner* — Mark K Buse

(57) ABSTRACT

A dual-mode lubricator with movement-limiting function and potentiometer includes a lower platform structure, upper platform structure fixed on the lower platform structure through multiple support columns, a rotating gear, a driving motor used to drive the rotating gear, a screw member installed in the center of the lower platform structure, the upper platform structure and the rotating gear and connected to the rotating gear and provided with a straight groove, a grease pressing seat connected to the screw member, a movement-limiting member set below the lower platform structure and having a front protrusion, a connector pivotally connected to the screw member, and a potentiometer module with an internal database that stores the data of the corresponding information between the position of the connector and the amount of the remaining grease.

10 Claims, 9 Drawing Sheets

DUAL-MODE LUBRICATOR WITH MOVEMENT-LIMITING FUNCTION AND POTENTIOMETER

BACKGROUND OF THE INVENTION

1. Field of the Invention

The present invention relates to lubricator technology, especially a dual-mode lubricator with movement-limiting function and potentiometer.

2. Description of the Related Art

The rapid development of science and technology has driven humans to have a better quality of life. However, in order to further improve the quality of human life, how to use simple and convenient but effective method structures and improvements will be even more important to the improvement of technology, product quality and related safety guarantees. Here, a reduction rotating gear set is generally used to push the grease through the oil outlet to inject grease for lubrication and has been used for many years. However, the grease injector made of this structure has complicated mechanical devices and consumes excessive component costs and assembly costs. There are also shortcomings in the basic structure that can easily cause inconvenience in use.

SUMMARY OF THE INVENTION

The present invention provides a dual-mode lubricator with movement-limiting function and potentiometer, which comprises a lower platform structure, an upper platform structure, a rotating gear, a driving motor, a screw member, a grease pressing seat, a movement-limiting member, a potentiometer module and a connector. The lower platform structure has a plate-like appearance and a hollow central axis. The upper platform structure has a hollow central axis, and is fixed on the lower platform structure through multiple support columns. The rotating gear is disposed between the lower platform structure and the upper platform structure. The driving motor is connected to the rotating gear and used to drive the rotating gear. The driving motor is selectively arranged on the upper platform structure or between the upper platform structure and the lower platform structure. The screw member is installed in the center of the lower platform structure, the upper platform structure and the rotating gear. The screw member has a tail end, an opposing top, and a straight groove on one side thereof between the tail end and the top. The straight groove is parallel to the screw member. The screw member is connected to the rotating gear. The grease pressing seat is connected to the tail end of the screw member. The movement-limiting member is set below the lower platform structure through a locking member. The movement-limiting member comprises a protrusion located at the front end. The potentiometer module is installed on the upper platform structure. The potentiometer module comprises a slide rail groove. The connector has one end thereof located in the slide rail groove and moving correspondingly with the movement of the screw member, and an opposite end thereof pivotally connected to the top. The potentiometer module has an internal database that stores the data of the corresponding information between the position of the connector and the amount of the remaining grease. In either the first mode or the second mode, the screw member is movable upward or downward through external force driving. In the first mode, the protrusion enters the straight groove, and in the second mode, the protrusion leaves the straight groove. The mode switching between the first mode and the second mode can be made by a manual method or an automatic control method.

In one embodiment of the present invention, in the first mode in which the protrusion enters said straight groove, when the driving motor drives the rotating gear, the screw member moves upward or downward with without rotation.

In one embodiment of the present invention, in the second mode in which the protrusion leaves the straight groove, when the grease pressing seat is manually rotated, the screw member moves upward or downward in a spiral manner while rotating.

In one embodiment of the present invention, the dual-mode lubricator with movement-limiting function and potentiometer further comprises a casing, a top cover and a battery. The battery is set within the casing. The top cover is set above the casing. The casing is used to cover the lower platform structure and the upper platform structure. The battery is connected to the driving motor.

In one embodiment of the present invention, the dual-mode lubricator with movement-limiting function and potentiometer further comprises a grease container installed below the lower platform structure. The grease pressing seat is located inside the grease container.

In one embodiment of the present invention, the manual method is used to move the protrusion of the movement-limiting member into or out of the straight groove.

In one embodiment of the present invention, the automatic control method is used to move the protrusion of the movement-limiting member into or out of the straight groove.

In one embodiment of the present invention, the movement-limiting member is a latch.

In one embodiment of the present invention, the straight groove is a trench.

In one embodiment of the present invention, as the screw member moves, the remaining grease information is obtained through one end of the connector at the position of the slide rail groove.

In one embodiment of the present invention, the potentiometer module is a circuit board with a potentiometer function.

The purpose, technical content, characteristics and effects achieved by the present invention will be more easily understood through detailed description of specific embodiments below.

DETAILED DESCRIPTION OF THE PREFERRED EMBODIMENT

In order to solve the traditional problems of existing lubricators, the inventor has spent many years of research and development to improve the criticisms of existing products. The following will introduce in detail how the present invention achieves the most efficient functional requirements with a dual-mode lubricator with movement-limiting function and potentiometer.

Figure 1:
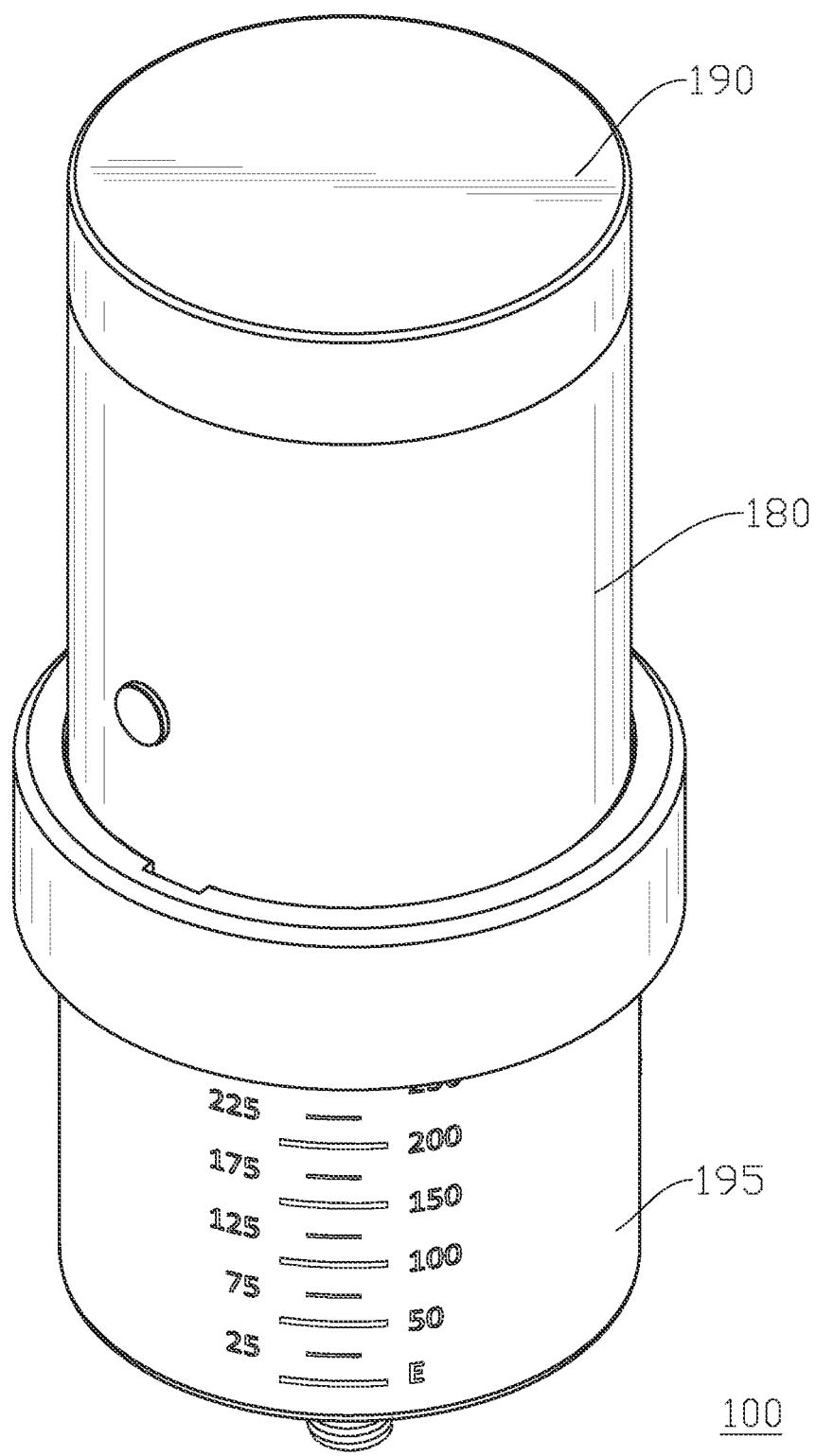
FIG. 1 is a schematic diagram of the dual-mode lubricator with movement-limiting function and potentiometer of the present invention.
Figure 2:
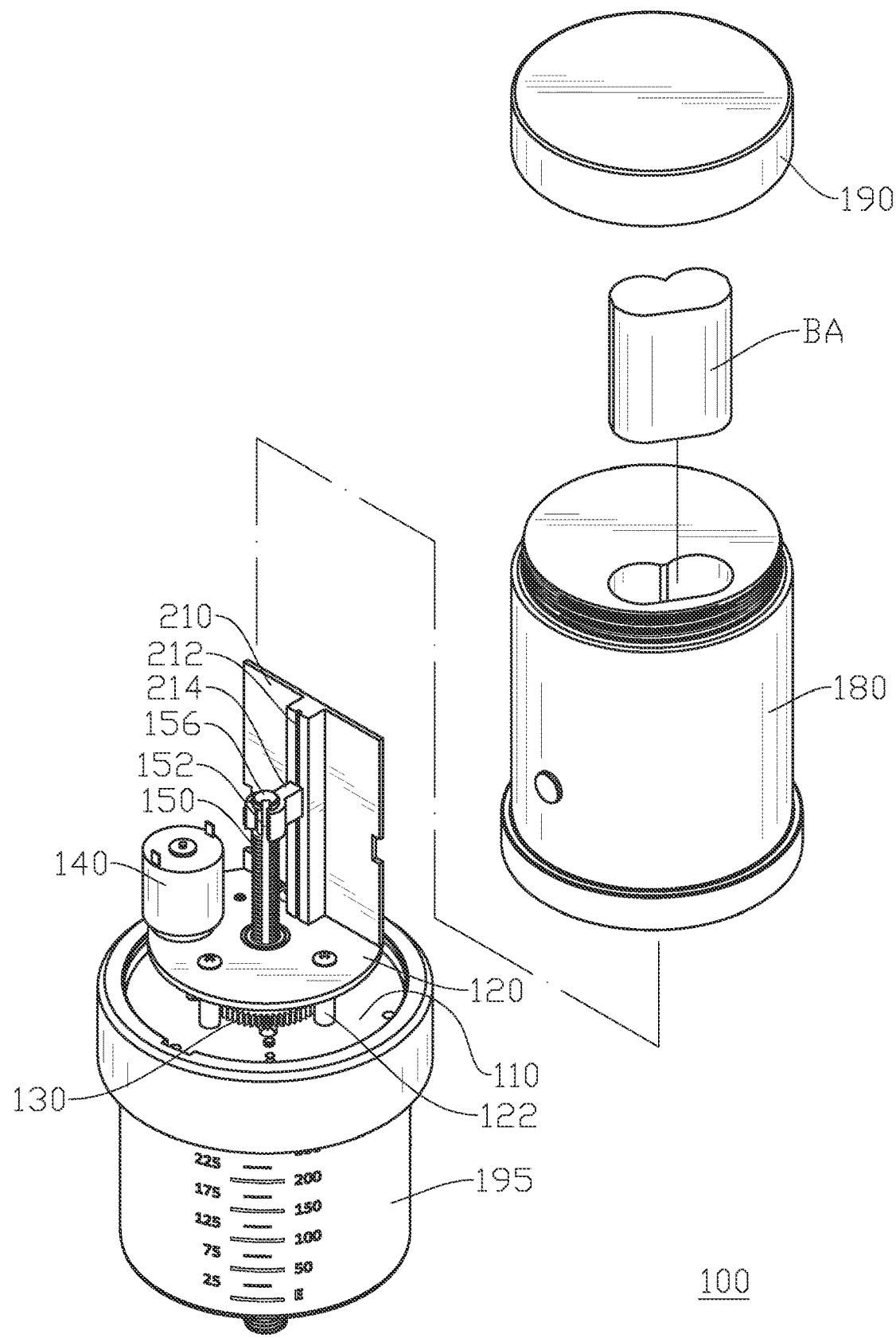
FIG. 2 is a three-dimensional exploded schematic diagram of the dual-mode lubricator with movement-limiting function and potentiometer of the present invention.
Figure 3:
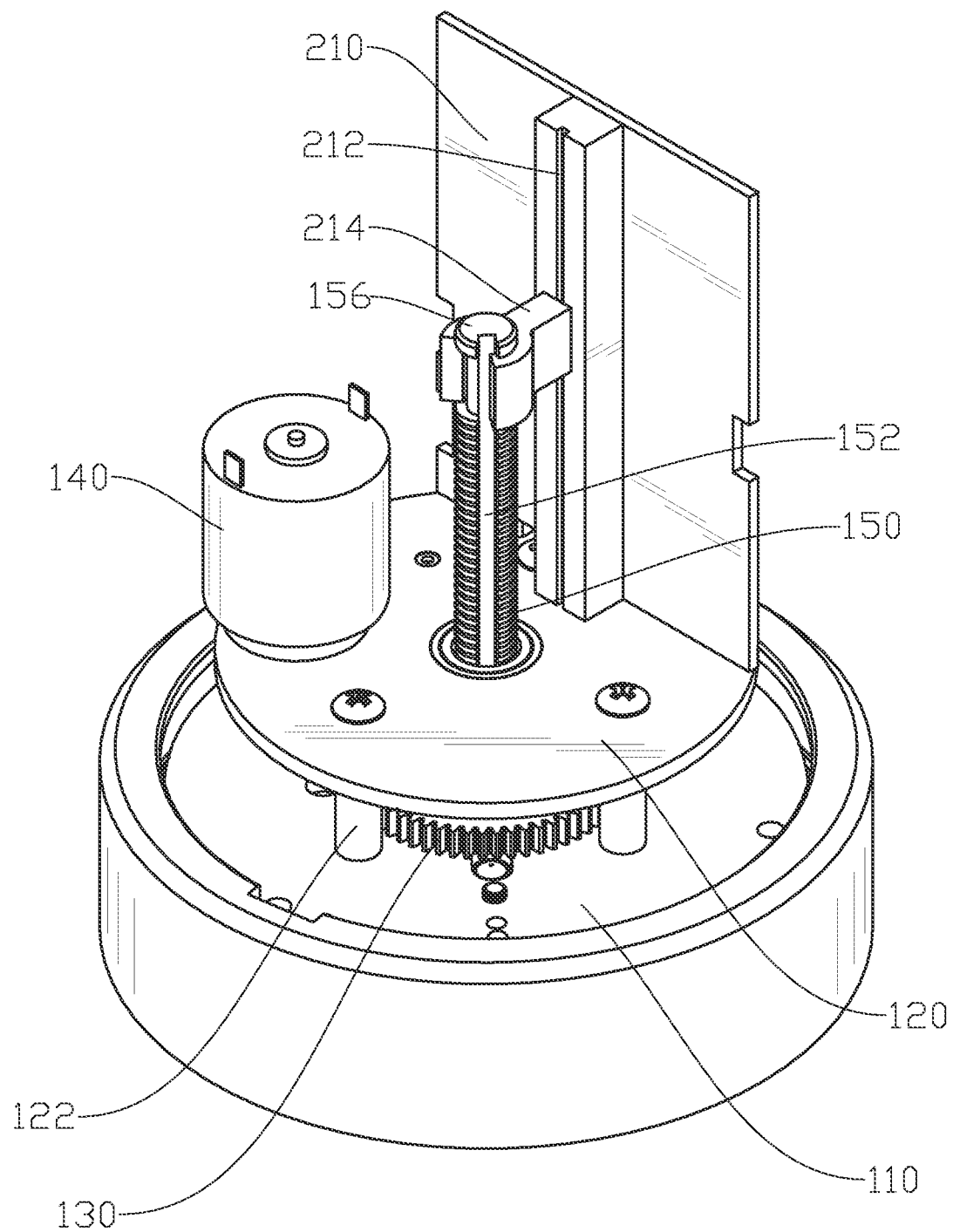
FIG. 3 is a top view of the dual-mode lubricator with movement-limiting function and potentiometer of the present invention.
Figure 4:
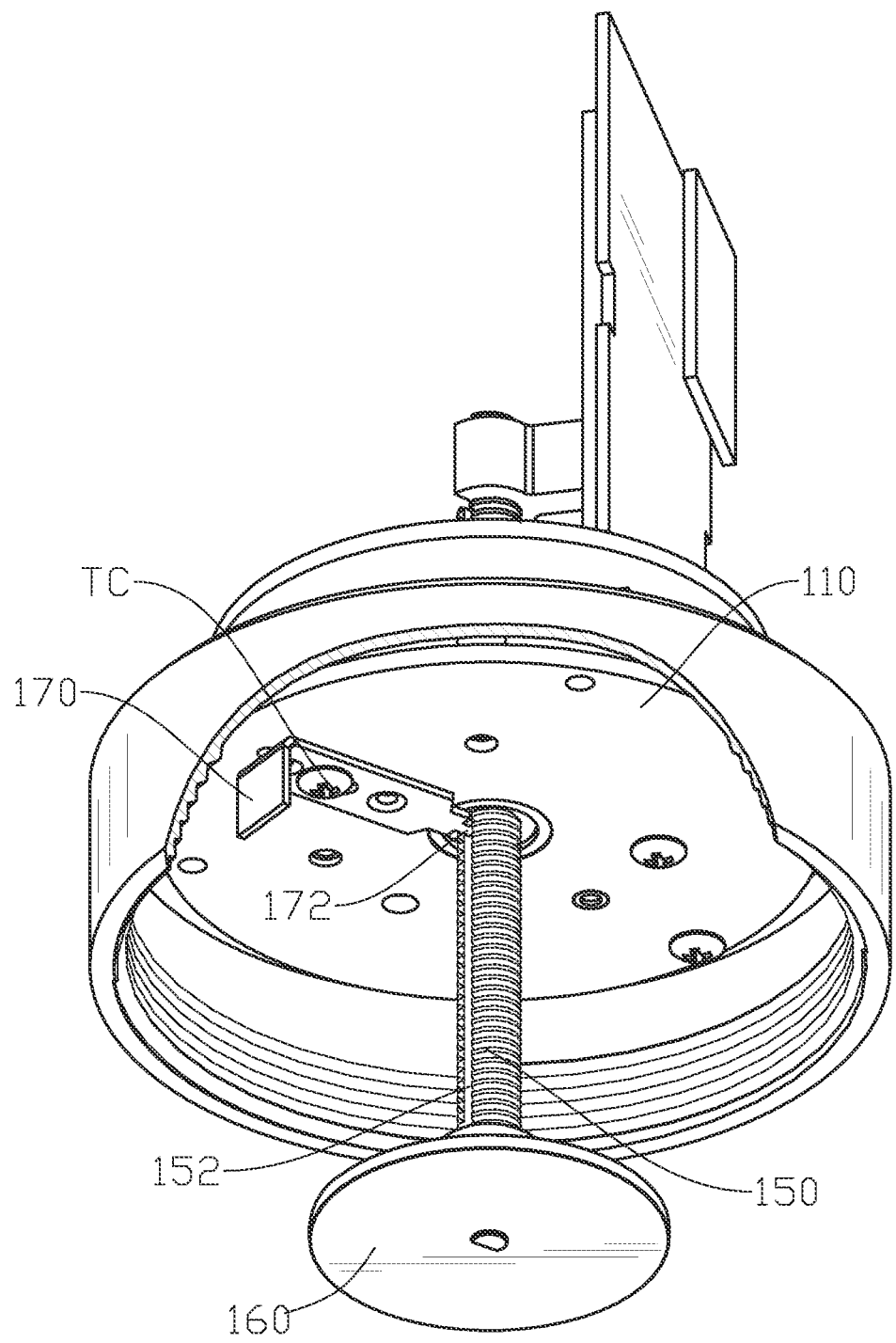
FIG. 4 is a bottom view of the dual-mode lubricator with movement-limiting function and potentiometer of the present invention.
Figure 5:
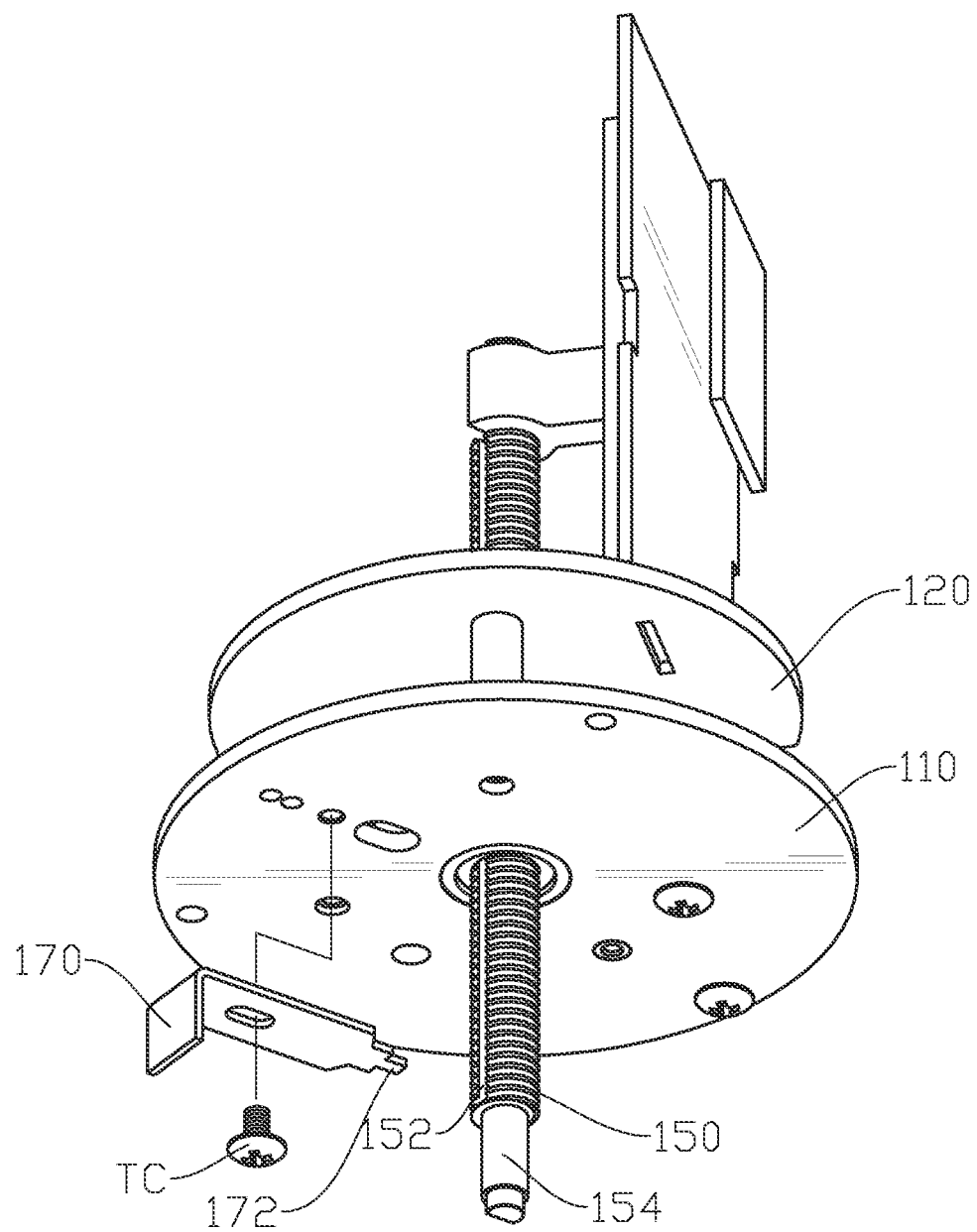
FIG. 5 is another bottom view of the dual-mode lubricator with movement-limiting function and potentiometer of the present invention.
Figure 6:
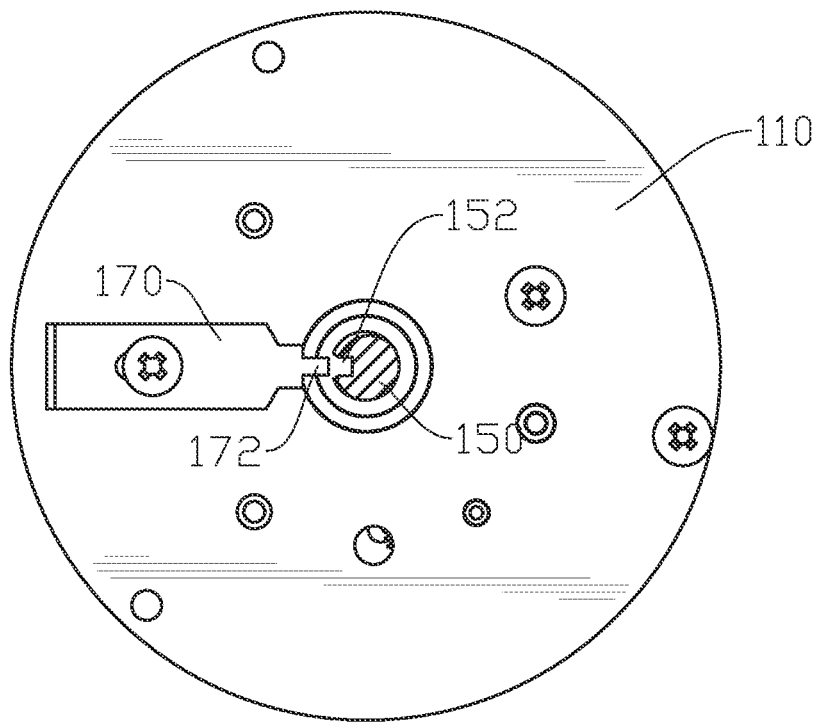
FIG. 6 is an action diagram of the movement-limiting member of the dual-mode lubricator with movement-limiting function and potentiometer of the present invention.
Figure 7:
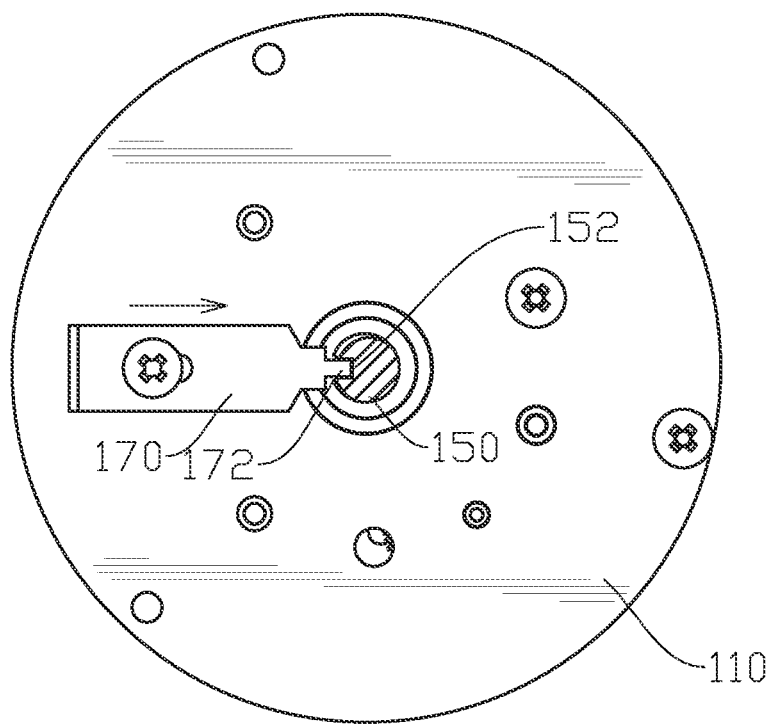
FIG. 7 is another action diagram of the movement-limiting member of the dual-mode lubricator with movement-limiting function and potentiometer of the present invention.

Please refer to FIGS. 1-7 where FIG. 1 is a schematic diagram of the dual-mode lubricator with movement-limiting function and potentiometer of the present invention, FIG. 2 is a three-dimensional exploded schematic diagram of the dual-mode lubricator with movement-limiting function and potentiometer of the present invention, FIG. 3 is a top view of the dual-mode lubricator with movement-limiting function and potentiometer of the present invention, FIG. 4 is a bottom view of the dual-mode lubricator with movement-limiting function and potentiometer of the present invention, FIG. 5 is another bottom view of the dual-mode lubricator movement-limiting function and potentiometer of the present invention, FIG. 6 is an action diagram of the movement-limiting member of the dual-mode lubricator with movement-limiting function and potentiometer of the present invention, and FIG. 7 is another action diagram of the movement-limiting member of the dual-mode lubricator with movement-limiting function and potentiometer of the present invention. As shown in the figures, in the embodiment of the present invention, the dual-mode lubricator with movement-limiting function and potentiometer 100 can have a first mode and a second mode to push out grease, and the first mode and the second mode can be switched to each other to meet different needs. The dual-mode lubricator with movement-limiting function and potentiometer 100 comprises a lower platform structure 110, an upper platform structure 120, a rotating gear 130, a driving motor 140, a screw member 150, a grease pressing seat 160, a movement-limiting member 170 and a potentiometer module 210. The lower platform structure 110 has a plate-like appearance and its central axis is hollow. The central axis portion of the upper platform structure 120 is hollow, and the upper platform structure 120 is fixed on the lower platform structure 110 through a plurality of support columns 122. The rotating gear 130 is disposed between the lower platform structure 110 and the upper platform structure 120. The driving motor 140 is connected to the rotating gear 130, and the driving motor 140 is used to directly or indirectly drive the rotating gear 130. The driving motor 140 can be disposed on the upper platform structure 120 or between the upper platform structure 120 and the lower platform structure 110. In the embodiment of the present invention, the driving motor 140 is disposed on the upper platform structure 120 as an example. The screw member 150 is disposed in the center of the lower platform structure 110, the upper platform structure 120 and the rotating gear 130. The screw member 150 has a straight groove 152 on its one side, and the straight groove 152 is parallel to the screw member 150. The screw member 150 is connected to the rotating gear 130. The screw member 150 has a tail end 154 connected to the grease pressing seat 160. The movement-limiting member 170 is set below the lower platform structure 110 through a locking member TC. The movement-limiting member 170 has a protrusion 172 at the front end. In addition, the potentiometer module 210 is provided on the upper platform structure 120. The potentiometer module 210 has a slide rail groove 212, which is connected to a screw member top 156 of the screw member 150 through a connector 214. One end of the connector 214 is located in the slide rail groove 212 and moves correspondingly with the movement of the screw member 150. The other end of the connector 214 is pivotally connected to the top 156. The potentiometer module 210 has an internal database that stores the data of the corresponding information between the position of the connector 214 and the amount of the remaining grease.

It should be noted that in either mode of the dual mode, the screw member 150 is driven by external force to move upward or downward. The first mode of the dual mode is the mode in which protrusion 172 enters the straight groove 152, and the second mode of the dual mode is the mode in which protrusion 172 leaves the straight groove 152. The mode switching method includes a manual method or an automatic control method. In addition, the potentiometer module 210 is a circuit board with a potentiometer function, and obtains the remaining grease information through one end of the connector 214 at the position of the slide rail groove 212. In the embodiment of the present invention, the movement-limiting member 170 is a latch, and the straight groove 152 is a trench.

The operation of dual-mode lubricator with movement-limiting function and potentiometer 100 will be further explained below. As shown in FIG. 7, the first mode is the mode in which the protrusion 172 enters the straight groove 152 (the screw member 150 will be limited and unable to rotate). Under this first mode, when the driving motor 140 drives the rotating gear 130, the screw member 150 can move up or down without rotating. On the other hand, as shown in in FIG. 6, under the second mode is the mode in which the protrusion 172 leaves the straight groove 152. Under this second mode, when the grease pressing seat 160 is manually rotated, the screw member 150 will move upward or downward in a spiral manner in the rotating state. In the embodiment of the present invention, the protrusion 172 of the movement-limiting member 170 can be manually moved into or out of the straight groove 152 through mode switching. In another embodiment, the protrusion 172 of the movement-limiting member 170 can be moved into or out of the straight groove 152 through an automatic control method through mode switching. It is worth mentioning that since one end of the connector 214 of the present invention is located in the slide rail groove 212 and moves correspondingly with the movement of the screw member 150, and the other end of the connector 214 is pivotally connected to the top 156, the potentiometer module 210 has an internal database that can be used to store the data of the corresponding information between the position of the connector 214 and the amount of the remaining grease. That is to say, when the other end of the connector 214 moves with the top 156, the end of the connector 214 located in the slide rail groove 212 will move within the slide rail groove 212. Through the above, the present invention can obtain the remaining grease information based on the position of one end of the connector 214 in the slide rail groove 212.

In addition, the dual-mode lubricator with movement-limiting function and potentiometer 100 further comprises a grease container 195, a casing 180, a top cover 190 and a battery BA. The battery BA is set within casing 180. The top cover 190 is set above the casing 180. The casing 180 is used to casing the lower platform structure 110 and the upper platform structure 120. The battery BA is connected to the driving motor 140 to provide the power energy required by the driving motor 140. The grease container 195 is installed below the lower platform structure 110. The grease pressing seat 160 is located inside the grease container 195, and the grease pressing seat 160 is used to directly or indirectly push the grease 195A.

Figure 8:
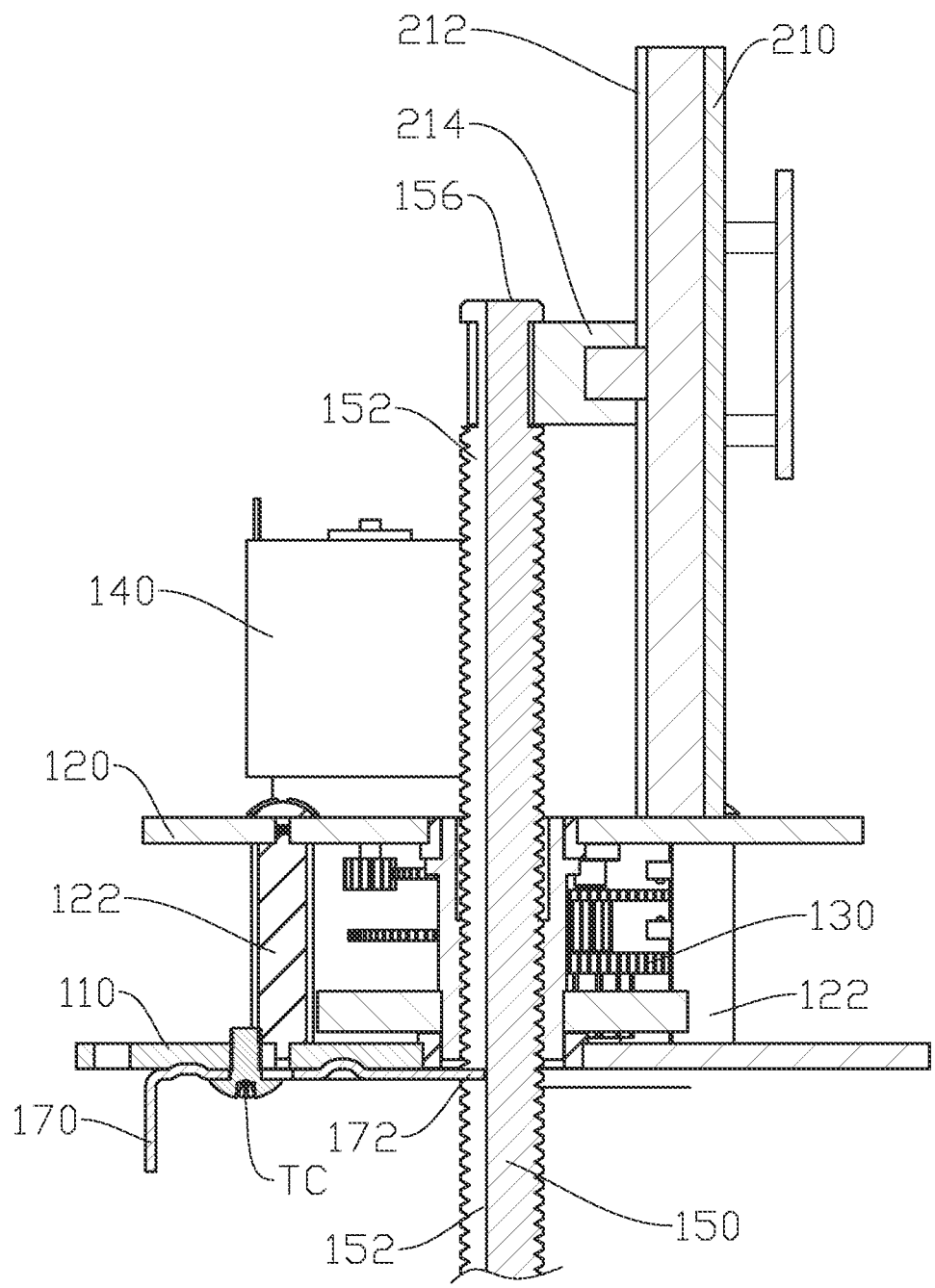
FIG. 8 is a side view of the dual-mode lubricator with movement-limiting function and potentiometer of the present invention.
Figure 9:
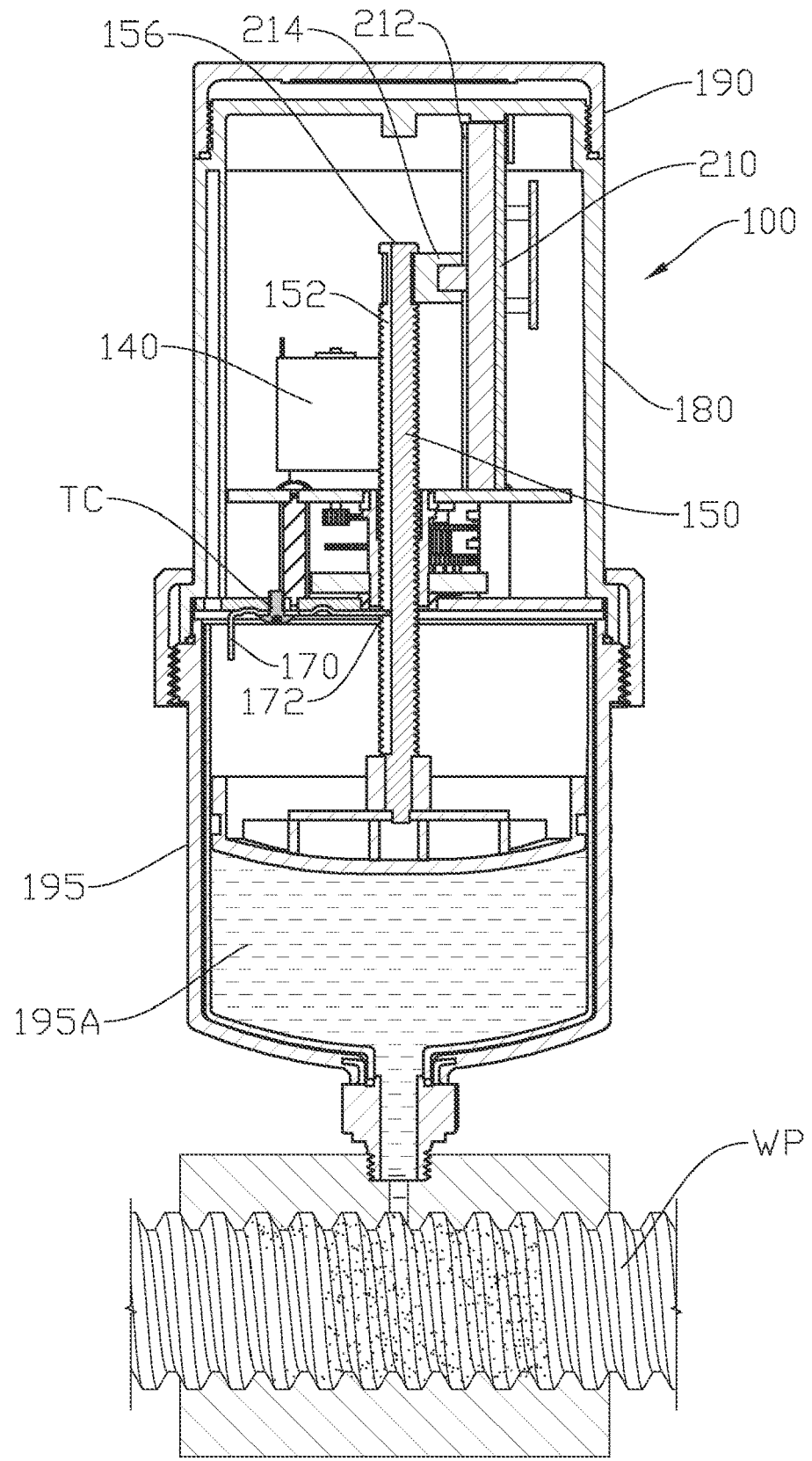
FIG. 9 is a working diagram of the dual-mode lubricator with movement-limiting function and potentiometer of the present invention.

Please refer to FIGS. 1 to 9 at the same time, where FIG. 8 is a side view of the dual-mode lubricator with movement-limiting function and potentiometer of the present invention and FIG. 9 is a working diagram of the dual-mode lubricator with movement-limiting function and potentiometer of the present invention. The dual-mode lubricator with movement-limiting function and potentiometer 100 in the embodiment of the present invention is used to perform grease processing on the workpiece WP to lubricate the workpiece WP. The grease container 195 contains a grease 195A. If the protrusion 172 is in the mode in which the protrusion 172 is entered into the straight groove 152 manually or automatically, then when the driving motor 140 drives the rotating gear 130, the screw member 150 can move downward without rotating, and during this operation, the remaining grease information can be understood in real time through the potentiometer module 210, which will be more efficient in grease injection than the traditional operation method.

In summary, the dual-mode lubricator with movement-limiting function and potentiometer disclosed in the present invention can achieve the following effects:

1. Improve grease injection efficiency.
2. Quickly understand remaining grease information.
3. Reduce parts consumption and reduce costs.

The above descriptions are only preferred embodiments of the present invention and are not intended to limit the scope of the present invention. Therefore, all equivalent changes or modifications made in accordance with the characteristics and spirit described in the scope of the present invention shall be included in the patent scope of the present invention.

What the invention claimed is:

1. A dual-mode lubricator with movement-limiting function and potentiometer selectively operable between a first mode and a second mode, comprising:
    a lower platform structure with a plate-like appearance and a hollow central axis;
    an upper platform structure with a hollow central axis, said upper platform structure being fixed on said lower platform structure through multiple support columns;
    a rotating gear disposed between said lower platform structure and said upper platform structure;
    a driving motor connected to said rotating gear and used to drive said rotating gear, said driving motor being selectively arranged on said upper platform structure or between said upper platform structure and said lower platform structure;
    a screw member installed in the center of said lower platform structure, said upper platform structure and said rotating gear, said screw member comprising a tail end, an opposing top and a straight groove on one side thereof between said tail end and said top, said straight groove being parallel to said screw member, said screw member being connected to said rotating gear;
    a grease pressing seat connected to said tail end of said screw member;
    a movement-limiting member set below said lower platform structure through a locking member, said movement-limiting member comprising a protrusion located at a front end thereof;
    a potentiometer module installed on said upper platform structure, said potentiometer module comprising a slide rail groove; and
    a connector, said connector having one end thereof located in said slide rail groove and moving correspondingly with the movement of said screw member, and an opposite end thereof pivotally connected to said top; and
    wherein said potentiometer module has an internal database that stores the data of the corresponding information between the position of said connector and the amount of the remaining grease; in either said first mode or said second mode, said screw member is movable upward or downward through external force driving; in said first mode, said protrusion enters said straight groove, and in said second mode, said protrusion leaves said straight groove; the mode switching between said first mode and said second mode is selectively achievable by a manual method.

2. The dual-mode lubricator with movement-limiting function and potentiometer as claimed in claim 1, wherein in said first mode in which said protrusion enters said straight groove, when said driving motor drives said rotating gear, said screw member moves upward or downward with no rotatory motion.

3. The dual-mode lubricator with movement-limiting function and potentiometer as claimed in claim 1, wherein in said second mode in which said protrusion leaves said straight groove, when said grease pressing seat is manually rotated, said screw member moves upward or downward in a spiral manner while rotating.

4. The dual-mode lubricator with movement-limiting function and potentiometer as claimed in claim 1, further comprising a casing, a top cover and a battery, said battery being set within said casing, said top cover being set above said casing, said casing being used to cover said lower platform structure and said upper platform structure, said battery being connected to said driving motor.

5. The dual-mode lubricator with movement-limiting function and potentiometer as claimed in claim 1, further comprising a grease container installed below said lower platform structure, wherein said grease pressing seat is located inside said grease container.

6. The dual-mode lubricator with movement-limiting function and potentiometer as claimed in claim 1, wherein said manual method is used to move said protrusion of said movement-limiting member into or out of said straight groove.

7. The dual-mode lubricator with movement-limiting function and potentiometer as claimed in claim 1, wherein said movement-limiting member is a latch.

8. The dual-mode lubricator with movement-limiting function and potentiometer as claimed in claim 1, wherein said straight groove is a trench.

9. The dual-mode lubricator with movement-limiting function and potentiometer as claimed in claim 1, wherein as said screw member moves, the remaining grease information is obtained through one end of said connector at the position of said slide rail groove.

10. The dual-mode lubricator with movement-limiting function and potentiometer as claimed in claim 1, wherein said potentiometer module is a circuit board with a potentiometer function.

* * * * *